United States Patent [19]

Credali et al.

[11] Patent Number: 4,560,429

[45] Date of Patent: Dec. 24, 1985

[54] PROCESS FOR PREPARING MOISTURE-RESISTANT PACKING CARDBOARD

[75] Inventors: Lino Credali, Casalecchio di Reno; Paolo Parrini, Ferrara; Mario Milano, Ferrara; Domenico Lori, Ferrara, all of Italy

[73] Assignee: Montedison S.p.A., Milan, Italy

[21] Appl. No.: 66,328

[22] Filed: Aug. 14, 1979

Related U.S. Application Data

[63] Continuation of Ser. No. 903,949, May 8, 1978, abandoned.

[30] Foreign Application Priority Data

May 9, 1977 [IT] Italy ................................ 23339 A/77

[51] Int. Cl.$^4$ ............................................... B31F 1/20
[52] U.S. Cl. ..................................... 156/208; 156/210; 156/292; 156/308.4; 264/286; 428/182; 428/186; 428/195

[58] Field of Search ................... 156/62.4, 205, 208, 156/210, 292, 308.4; 162/146, 157 R; 264/112, 123, 286; 428/182, 186, 297, 303, 513, 195

[56] References Cited

U.S. PATENT DOCUMENTS

| | | | |
|---|---|---|---|
| Re. 29,272 | 6/1977 | Hintz et al. | 156/208 |
| 3,290,205 | 12/1966 | Goldstein et al. | 156/205 X |
| 3,787,256 | 1/1974 | Nowotny | 156/62.6 X |

FOREIGN PATENT DOCUMENTS 48-23482  7/1973  Japan ................................ 162/146

*Primary Examiner*—Robert A. Dawson

[57] ABSTRACT

Moisture-resistant packing cardboard of the corrugated type is prepared from flat paper sheets formed from 10% to 90% by weight of cellulose fibers and from 90% to 10% by weight of fibrils of at least one thermoplastic polymer and having a surface area greater than 1.0 m$^2$/gm, by heating the sheets under pressure on an undulated surface and coupling the resulting corrugated or undulated sheets with one or more flat sheets to which the corrugated sheet is adhered through the tips of the corrugations or undulations.

2 Claims, No Drawings

PROCESS FOR PREPARING MOISTURE-RESISTANT PACKING CARDBOARD

This is a continuation of application Ser. No. 903,949 filed May 8, 1978 and now abandoned.

THE PRIOR ART

Packing material comprising corrugated cardboard is known in the art as "corrugated cardboard" and consists, substantially, of two or more flat paper sheets having one or more corrugated or undulated paper sheets interposed between them.

Said cardboards may be of the "mono-wave" type consisting of two flat paper sheets having a single corrugated paper sheet disposed between them, or they may be of the "multi-wave" type consisting of more than two flat paper sheets alternated with a plurality of undulated or corrugated paper sheets.

Said cardboards have little mechanical resistance under conditions of high humidity as found in particular enclosed spaces such as, for instance, in refrigerators, or in the open under certain weather conditions, or again following sudden temperature variations and variations in the relative humidity accompanied by phenomena of condensation of aqueous vapor.

In order to eliminate or overcome these drawbacks, said carboards must be subjected to complex and expensive treatments with moisture-resistant resins or with paraffins, such treatments being rather difficult to realize. In fact, if the treatments are carried out on cellulose sheets before the formation of the cardboard, there may occur problems in the course of the formation due to the loss of adhesion between the various components, resulting in extremely fragile materials. In other cases, as when paraffin is used, it is necessary to carry out the treatment on the corrugated cardboard in its final shape, by discontinuous and complicated methods.

THE PRESENT INVENTION

An object of this invention is to provide a process for obtaining corrugated cardboard having a high degree of resistance to humidity and free of the drawbacks of the processes and sheets of the art.

This and other objects is, or are, accomplished by using paper sheets comprising mixtures of cellulose with fibrils of thermoplastic polymers having a surface area higher than 1 m$^2$/g.

Fibrous structures known as fibrils or fibrides, plexofilamentary fibrides or micro-flakes of the same morphology as that of cellulosic fibers, can be obtained from synthetic polymers in general, and may be used as partial or total substitutes for cellulose fibers in the preparation of paper or of paper-like products, by the methods and devices used for producing traditional paper.

The essential characteristic of the fibrils, etc., is that of having a specific surface area greater than 1 sq.mt/g. In general, their greater length or size is comprised between 0.5 and 50 mm, and the apparent (or mean) diameter or lesser size is comprised between 1 and 400 microns.

According to British Pat. No. 868.651, such structures may be prepared by adding the solution of a synthetic polymer to a non-solvent of the polymer while contemporaneously subjecting the precipitated polymer or the polymer in a swollen state, to the action of shearing stresses. A similar process is described in British Patent Specification No. 2,208,553.

According to British Pat. No. 1,287,917, structures of a similar morphology and which may be used as substitutes for cellulose fibers in the preparation of paper, are obtained by the polymerization of alpha-olefins in the presence of condensation catalysts, under the action of shearing forces in the reaction medium.

Still other processes by which said fibrous structures are obtained in the state of more or less coherent aggregates, or of fibrilled filamentary structures (plexofilaments), consist in the extrusion through an orifice of solutions, emulsions, dispersion or suspensions of synthetic polymers in solving media, emulsifying or dispersing media, or mixtures thereof, under conditions of almost instantaneous evaporation of the solvent or of the liquid phase present in it ("flashspinning" processes).

Processes of this type are described, for instance in British Pat. Nos. 891,943 and 1,262,531, in U.S. Pat. Nos. 3,770,856, 3,740,383 and 3,808,091, in Belgian Pat. No. 789,808, in French Pat. No. 2,176,858 and in German Patent Application No. 2,343,543.

The fibrous aggregates or plexofilaments obtained according to such processes may be easily disaggregated by cutting up and beating (refining) until the constituent elementary fibrous structures having a specific surface area greater than 1 sq.mt/g, and suitable for use in the preparation of paper and other similar products, are obtained.

British Pat. No. 891,945 describes, for instance, the preparation of such fibrous structures (plexofilaments, fibrides) by the disaggregation of the plexofilaments obtained by flash-spinning of synthetic polymer solutions.

Lastly, fibrils or fibrous structures of analogous characteristics and uses may be conveniently obtained by subjecting a solution or suspension, emulsion or dispersion of a polymer in solvents and/or emulsifiers or dispersants, while it is extruded under conditions of fast evaporation of the liquid phase, to the shearing action of a gaseous fluid of high velocity and directed at an angle with respect to the direction of the extrusion. Processes of this type have been described in Italian Pat. No. 947,919 and in Italian Patent Application No. 29,594 A/74 assigned to Montedison S.p.A., and corresponding to the U.S. application of Giovanni DiDrusco et al, Serial No. 847,172 filed Oct. 31, 1977, now U.S. Pat. No. 4,211,737.

The process of the present invention for the preparation if cardboard of the corrugated or undulated type, either mono- or multi-wave, consists of the following operations or procedures:

(1) preparation of flat paper sheets, which comprise from 10% to 90% by weight of cellulose fibers and from 90% to 10% by weight of fibrils made of at least one thermoplastic polymer, and having a specific surface area greater than 1 sq.mt/gram;

(2) heating said paper sheets, under pressure and at a temperature equal to or greater than the melt temperature of the polymer that forms the fibrils, or at the melt temperature of the polymer with the lowest melt temperature among those polymers constituting such fibrils;

(3) preparation of sheets with undulations or corrugations, starting from the flat sheets, obtained in operations (1) and (2), by heating said flat sheets, under pressure on an undulated surface, at a temperature equal to or greater than the melt temperature of the thermoplastic polymer contained in such sheets, or to the melt temperature of the thermoplastic polymer with the lowest melt temperature among the melt temperatures of the thermoplastic polymers contained in said sheets;

(4) coupling the flat sheets obtained according to operation (2) to the corrugated sheets alternately one to the other, by simultaneously welding or bonding the alternating assembled sheets to each other along the tips or tops of the undulations in the undulated sheets by means of binders, or by melting the synthetic polymer present in the sheets.

The preparation of the sheets according to operation (1) may be achieved by deposition of cellulose/fibrils mixtures obtained from the aqueous suspensions thereof, according to the conventional techniques used in the paper industry. Preferably, for the purposes of this invention, there are used mixtures of cellulose with thermoplastic fibrils comprising from 20% to 80% by weight of cellulose and from 80% to 20% by weight of the thermoplastic fibrils.

The sheets may be either of the mono-layer kind, that is formed by one single fibrous layer of unifom composition, or of the multi-layer kind, that is, consisting of a plurality of layers of different composition with respect to each other. In this latter case, the above-indicated percentages of cellulose and fibrils is to be understood to be referred to each single layer of uniform composition.

The fibrils may consist of any fibrogenous synthetic thermoplastic polymer, and may have incorporated with them inert charges (fillers) of various types, such as, for instance, kaolin, calcium carbonate, talc, silicates, titanium dioxide, and calcium sulphate, in quantities of up to 70% of the total weight of the thermoplastic polymer.

Thermoplastic polymers which can form such fibrils are for instance, the homopolymers of the olefins, in particular ethylene, propylene and 4-methyl-pentene-1, of vinyl chloride and of vinyl monomers in general, of oxymethylene, of amides, of acrylonitrile, as well as the polyester resins and the polymers consisting of the co-polymerized monomers.

The cellulose fibers mixed with the synthetic fibrils may be of chemical, semi-chemical or even regenerated cellulose, of wood pulp, and other fibers normally used in this field.

The heating operation (2) under pressure may be carried out, for instance, on cylinder calanders or in discontinuous flat plate presses, or on continuous belt presses.

The pressure is preferably at least 0.1 kg/cm$^2$ on the cylinder calanders and at least 0.1 kg/cm$^2$ in plate or belt presses.

The preparation of the corrugated sheets according to operation (3) may be realized by using the sheets coming from heating and melting operation (2) or using the sheets not yet thermotreated, obtained in operation (1) by processing it on pairs of fluted rolls suitably heated.

Assembling operation (4) is achieved by interposing a corrugated sheet between two flat sheets and by making it adhere to them through the tips of the undulations by means of a conventional binder or glue, or by fusion of the thermoplastic polymer contained in the sheet, at the tips of the undulations.

That method of achieving the adhesion (thermowelding) may also be used for the adhesion of only a single flat sheet to the corrugated sheet, while the second flat sheet may be made to adhere to the undulation by using a conventional binder. The method of thermowelding is at any rate to be preferred inasmuch as it insures a better adhesion of the sheets under conditions of high humidity. Said method is favored by the use of high concentrations (greater than 50% by weight) of thermoplastic fibrils in the starting sheets, or at least in those layers of the single sheets which are destined to be put into contact and adhered to each other by thermowelding.

All of the above-described operations which characterize the process of this invention, may be carried out continuously on machines of the type used for the manufacture of corrugated cardboard of cellulose only (corrugating machines), suitably fitted with heating means (infrared lamps, steamheated cylinders, etc.,) for achieving the melting of the thermoplastic fibrils as required in the operational stage (3) and possibly in phase (4).

The process of this invention may be applied to the preparation of corrugated cardboard of both the mono- and multi-wave type, using a suitable number of sheets. Within the scope of this process one may introduce numerous variants such as the formation on the starting sheets of homogeneous layers of cellulose fibers only, or of thermoplastic fibrils only, followed by their fusion in the operational stages (2) or (3), with the formation of an impermeable polymer film.

The following examples are given to illustrate the invention in more detail and not as limiting.

EXAMPLE 1

On a continuous, flat table machine there was prepared paper starting from an aqueous suspension of a mixture of fibers consisting of:

30% by weight of polyethylene fibrils (melt temp.=135° C.) having a length of between 2 and 3 mm, a mean diameter of 18 microns and a specific surface area equal to 5 sq.mt/g, said fibrils having incorporated therein 30% by weight of kaolin;

70% by weight of bleached conifer cellulose. The paper had a weight of 150 g/m$^2$.

Said paper was passed on a roller calander, at a temperature of 155° C. and under a pressure of 4 kg/cm.

Three rolls (reels) of paper thus prepared and treated were used for the preparation of a corrugated cardboard on a conventional (standard) corrugating machine. The adhesion of the various components of the cardboard was achieved by the use of a conventional starch-based glue. The carboard showed the following characteristics:

| weight | 540 g/sq. mt |
| --- | --- |
| thickness | 4.1 mm |
| vertical compression | 25 kg/10 cm. |
| bending load (*) | 2 kg. |

The carboard, after resting for 72 hours in a room at 4° C. and a relative humidity of 90%, had the following properties:

| vertical compression | 16 kg/10 cm |
| --- | --- |
| bending load | 0.8 kg |

EXAMPLE 2

On a two-jet paper machine and using the polyethylene fibrils described in Example 1, there was prepared a two-layer paper characterized by:

| overall weight | 200 g/sq.mt |
|---|---|
| weight of 1st layer | 100 g/sq.mt |
| composition of 1st layer | 60% of polyethylene fibrils |
| | 40% of unbleached conifer cellulose |
| weight of 2nd layer | 100 g/sq.mt |
| composition of 2nd layer | 100% of unbleached conifer cellulose |

The paper of said composition was calandered on a cylinder or roller calander the cylinders of which were heated to a temperature of 160° C. The pressure exerted on the paper amounted to 8 kg/cm. Three reels of the paper thus obtained were contemporaneously fed to the corrugating machine for the preparation of a corrugated cardboard of the single-wave type.

The two flat paper sheets were thermowelded to the corrugated paper, taking care that the two papers were put in contact with each other at the tips of the waves on the layer containing the synthetic fibrils. The temperature of the undulating surface was comprised between 180° and 190° C.

The second flat paper sheet was glued onto the inner side of the undulated (corrugated) paper by means of a starchbased glue. The cardboard thus obtained had the following characteristics:

| weight | 760 g/sq.mt. |
|---|---|
| thickness | 4.6 mm |
| vertical compression | 66 kg/10 cm |
| bending load (*) | 3.2 kg. |

This cardboard, after resting for 72 hours in a room at 4° C. and 90% relative humidity, had the following properties:

| vertical compression | 30 kg/10 cm |
|---|---|
| bending load (*) | 1.5 kg. |

EXAMPLE 3

(Comparative Example)

A cardboard was prepared under the conditions of the preceding examples but using three papers having a weight of 200 g/m² and consisting only of unbleached cellulose of the same type as used in the preceding examples.

The three sheets were glued to each other by a conventional starch-based glue. The cardboard had the following characteristics:

| weight | 728 g/sq.mt. |
|---|---|
| thickness | 4.3 mm |
| vertical compression | 50 kg/10 cm |
| bending load (*) | 0.1 kg. |

(*) The bending load was determined on a test piece 7.5 cm wide and 20 cm long.

What is claimed is:

1. A process for the preparation of mono- or multiwave corrugated cardboard which consists of the following operations:
   (1) preparation of flat paper sheets containing from 20% to 80% by weight of cellulose fibers and from 80% to 20% by weight of synthetic thermoplastic polymer fibrils having a specific surface area greater than 1 sq.mt/gram;
   (2) heating said paper sheets, under pressure, and at a temperature equal to or higher than the melt temperature of the thermoplastic synthetic polymer forming said fibrils, or higher than the melt temperature of the polymer having the lowest melt temperature among those of the polymers forming said fibrils;
   (3) preparation of corrugated paper sheets starting from flat paper sheets obtained according to operations (1) or (2), by heating said flat paper sheets under pressure, on an undulated surface, at a temperature equal to or higher than the melt temperature of the synthetic thermoplastic polymer contained in said sheets, or higher than the melt temperature of the thermoplastic polymer having the lowest melt temperature among the synthetic thermoplastic polymers contained in said sheets; and
   (4) coupling the flat sheets obtained according to operation (2) to the corrugated sheets of paper, alternately the one to the other, with simultaneous mutual welding at the tips of the undulations, by binders or by melting of the synthetic thermoplastic polymer present in the sheets at the tips of the undulations.

2. The process of claim 1 in which the syntnetic thermoplastic polymer fibrils are fibrils of polyethylene.

* * * * *